United States Patent
Kawahara et al.

(10) Patent No.: US 7,881,601 B2
(45) Date of Patent: Feb. 1, 2011

(54) ELECTRONIC CAMERA

(75) Inventors: Takumi Kawahara, Tokyo (JP); Yasuyuki Motoki, Kawasaki (JP); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 42 days.

(21) Appl. No.: 12/289,747

(22) Filed: Nov. 3, 2008

(65) Prior Publication Data

US 2009/0147107 A1 Jun. 11, 2009

Related U.S. Application Data

(63) Continuation of application No. 11/345,393, filed on Feb. 2, 2006, now abandoned.

(30) Foreign Application Priority Data

Feb. 15, 2005 (JP) ............................. 2005-037675
Feb. 15, 2005 (JP) ............................. 2005-038424

(51) Int. Cl.
*G03B 13/34* (2006.01)
(52) U.S. Cl. ....................................... 396/123; 348/77
(58) Field of Classification Search ................. 396/123; 348/77
See application file for complete search history.

(56) References Cited

U.S. PATENT DOCUMENTS

| | | | |
|---|---|---|---|
| 5,604,538 A | 2/1997 | Kaneda et al. | |
| 6,301,440 B1 | 10/2001 | Bolle et al. | |
| 2003/0071908 A1 | 4/2003 | Sannoh et al. | |
| 2004/0119852 A1 | 6/2004 | Shin | |
| 2004/0207743 A1 | 10/2004 | Nozaki et al. | |
| 2004/0208114 A1 | 10/2004 | Lao et al. | |
| 2004/0233296 A1* | 11/2004 | Sugimoto | 348/222.1 |
| 2005/0046730 A1 | 3/2005 | Li | |
| 2005/0179780 A1 | 8/2005 | Kikkawa et al. | |
| 2007/0065134 A1 | 3/2007 | Sugimoto | |
| 2007/0248345 A1 | 10/2007 | Nozaki et al. | |

FOREIGN PATENT DOCUMENTS

| | | |
|---|---|---|
| JP | A 4-133576 | 5/1992 |
| JP | A 7-270671 | 10/1995 |
| JP | A 2001-215403 | 8/2001 |
| JP | A-2001-304855 | 10/2001 |

(Continued)

OTHER PUBLICATIONS

Apr. 27, 2010 Office Action issued in Japanese Patent Application No. 2005-038424 (with Translation).

(Continued)

*Primary Examiner*—Christopher E Mahoney
*Assistant Examiner*—Fang-Chi Chang
(74) *Attorney, Agent, or Firm*—Oliff & Berridge, PLC

(57) ABSTRACT

An electronic camera includes a face detecting section, a setting section, and a controlling section. The face detecting section detects a face of a subject. The setting section sets a scene shooting mode to adjust a shooting condition to an optimum shooting condition in accordance with each preassumed shooting scene. The controlling section controls the face detection of the face detecting section only when the setting section has set a scene shooting mode for shooting a scene including a person.

6 Claims, 17 Drawing Sheets

FOREIGN PATENT DOCUMENTS

| | | |
|---|---|---|
| JP | A-2002-162559 | 6/2002 |
| JP | A 2003-107335 | 4/2003 |
| JP | A-2003-189325 | 7/2003 |
| JP | A-2003-344891 | 12/2003 |
| JP | A-2004-023656 | 1/2004 |
| JP | A 2004-117776 | 4/2004 |
| JP | A-2004-185555 | 7/2004 |
| JP | A-2004-349750 | 12/2004 |

OTHER PUBLICATIONS

Notice of Reason for Refusal issued in Japanese Patent Application No. 2005-037675; mailed Jun. 22, 2010; with English-language translation.

* cited by examiner (a)

(b)

(a)

(b)

VIEW SHOWING VIEWFINDER IMAGE IN FACE RECONGNTION

ELECTRONIC CAMERA

CROSS REFERENCE TO RELATED APPLICATION

This is a Continuation of application Ser. No. 11/345,393 filed Feb. 2, 2006, which in turn claims the benefit of priority from Japanese Patent Applications Nos. 2005-037675 and 2005-038424, both filed on Feb. 15, 2005, the entire contents of which are incorporated herein by reference.

BACKGROUND OF THE INVENTION

1. Field of the Invention

The present invention relates to an electronic camera which captures an image of a subject, and particularly relates to an electronic camera which can detecting a characteristic portion of a subject, for example, a face.

2. Description of the Related Art

There has been proposed a camera which, in order to focus on a face of a subject when the subject is a person, detects the face portion of the person in a field captured by the camera and autofocuses on the detected face area.

However, it is conceivable that such problems that the face is not detectable or detection accuracy is low may occur depending on a shooting situation or shooting environment, which may lead to confusing a user.

For example, Japanese Unexamined Patent Application Publication No. 2001-215403 discloses an electronic camera having a face recognition function and performing focusing control according to the eyes of a subject.

However, the electronic camera in Japanese Unexamined Patent Application Publication No. 2001-215403 has a difficulty in focusing on the eyes of the subject when the subject closes his or her eyes or wears glasses, and the focusing operation thereof is low in stability. Therefore, there is still room for improvement.

SUMMARY OF THE INVENTION

The present invention is made to solve any one of the above problems in the related art.

An object of the present invention is to provide an electronic camera which prevents a user from being confused. Another object of the present invention is to provide an electronic camera which can stably focus on a person as a subject by recognizing his/her face.

Hereinafter, the present invention will be described.

An electronic camera according to a first aspect of the present invention includes a face detecting section, a setting section, and a controlling section. The face detecting section detects a face of a subject. The setting section sets a scene shooting mode to adjust a shooting condition to an optimum shooting condition in accordance with each pre-assumed shooting scene. The controlling section controls the face detection of the face detecting section only when the setting section has set a scene shooting mode for shooting a scene including a person.

According to the electronic camera of the above first aspect, it is desirable that the scene shooting mode for shooting the scene including a person be a portrait shooting mode.

According to the electronic camera of the above first aspect, it is desirable that the controlling section does not allow the face detecting section to perform the face detection when the portrait shooting mode is a portrait shooting mode for shooting a night landscape.

According to the electronic camera of the above first aspect, it is desirable that the controlling section control a shooting lens to focus on a face area detected by the face detecting section.

According to the electronic camera of the above first aspect, it is desirable that it further include a function setting section which sets a function for each scene shooting mode, and that the scene shooting mode for shooting the scene including a person is provided with a setting item regarding the face detection.

According to the electronic camera of the above first aspect, it is desirable that it stop a digital zoom function of electronically magnifying a magnifying power during the face detection by the face detecting section.

According to the electronic camera of the above first aspect, it is desirable that it stop a closeup shooting function of shifting a shooting lens for closeup shooting during the face detection by the face detecting section.

According to the electronic camera of the above first aspect, it is desirable that it further include a display section which displays a subject image obtained before shooting, and that during the face detection by the face detecting section, the amount of shooting information for display on the display section is reduced compared with while the face detection is not performed.

An electronic camera according to a second aspect of the present invention includes an image pickup device, a face recognizing section, a focus area specifying section, and a focusing section. The image pickup device photoelectrically converts a subject image obtained by an optical shooting system to generate an image signal of an image shooting plane. The face recognizing section detects a face area in the image shooting plane according to the image signal.

The focus area specifying section sets as a specified focus area, a focus area including a contour of the face area among a group of focus areas arranged in the image shooting plane. The focusing section calculates a focus evaluation value of the subject image according to the image signal corresponding to the specified focus area and detects as a focusing position a position of the optical shooting system when the focus evaluation value is maximum.

According to the electronic camera of the above second aspect, it is desirable that the focus area specifying section set, as the specified focus area, a part of plural focus areas including the contour of the face area. In this case, it is particularly desirable that the focus area specifying section set, as the specified focus area, a focus area overlapping with the contour of the face area at an upper side or a side thereof.

According to the electronic camera of the above second aspect, it is desirable that the focus area specifying section change the specified focus area to a focus area located below the face area, when the focusing position is not detected in the focus area including the contour of the face area.

According to the electronic camera of the above second aspect, the face recognizing section detects a direction of the face based on a positional relation of face parts in the face area. It is desirable that the focus area specifying section change a position of the focus area to be the specified focus area, according to the direction of the face.

According to the electronic camera of the above second aspect, it is desirable that it further include an attitude detecting section which detects a shooting attitude of the electronic camera, and that the focus area specifying section change a position of the focus area to be the specified focus area, according to the shooting attitude.

According to the electronic camera of the above second aspect, it is desirable that it further include an electronic viewfinder. The electronic viewfinder displays a viewfinder image of the image shooting plane according to the image signal, and displays an indication of focusing failure associated with a face area of the viewfinder image when the focusing position is not detected in the specified focus area.

BRIEF DESCRIPTION OF THE DRAWINGS

The nature, principle, and utility of the invention will become more apparent from the following detailed description when read in conjunction with the accompanying drawings in which like parts are designated by identical reference numbers in which.

DESCRIPTION OF THE PREFERRED EMBODIMENTS

Hereinafter, a description is given of embodiments of the invention with reference to the accompanying drawings.

Configuration of First Embodiment

First, the configuration of an electronic camera 1 according to a first embodiment of the present invention will be described.

Figure 1:
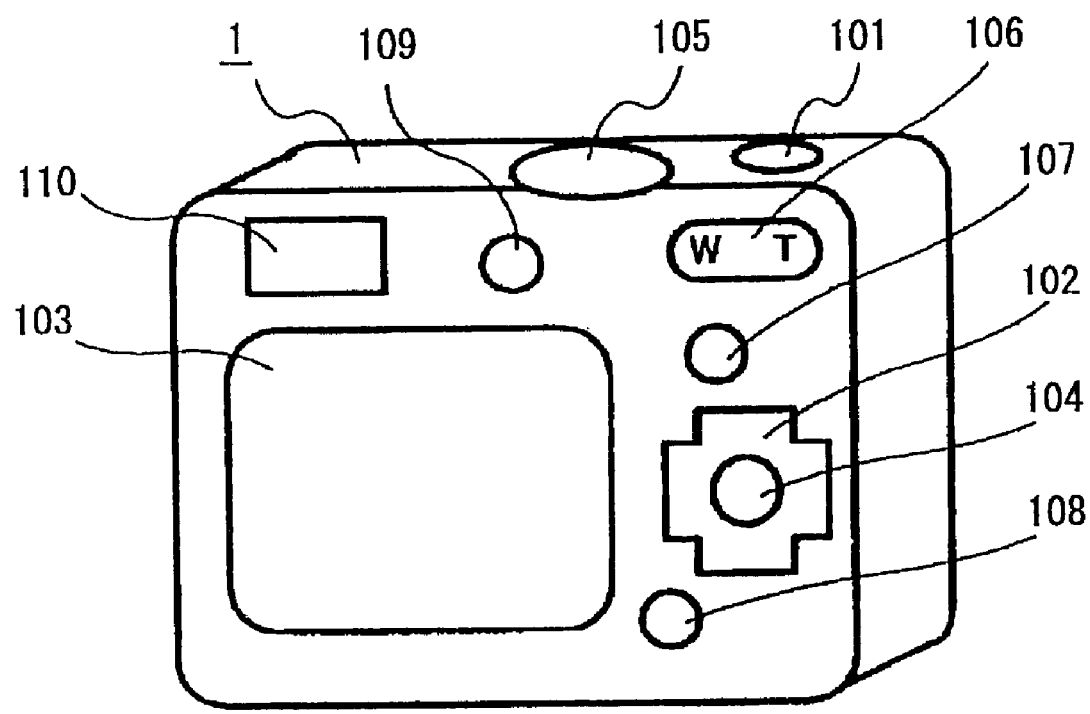
FIG. 1 is an external view of an electronic camera 1 according to a first embodiment.

FIG. 1 is an external view of the electronic camera 1 according to the first embodiment. In FIG. 1, the electronic camera 1 includes a release button 101, a cruciform key 102, a monitor 103, a decision button 104, a mode select dial 105, a zoom button, 106, a menu button 107, a play button 108, a closeup shooting button 109, and an optical viewfinder 110.

The release button 101 is a button capable of detecting two-stage operations: a half-press stage and a full-press stage. The release button 101 is manipulated by a user when the user instructs the start of shooting. The cruciform key 102 is manipulated by the user to move a cursor or the like on the monitor 103. The decision button 104 is a button manipulated by the user when the user selects and decides an item with the cruciform key 102 or the like. The decision button 104 is manipulated by the user also when the user switches on/off states of the monitor 103.

The mode select dial 105 is a dial which enables the user to change a camera function such as a shooting scene selection by turning it. The zoom button 106 is a button manipulated by the user when the user optically and electronically scales up or down an image recorded at the time of shooting. The zoom button 106 is manipulated by the user also when at the time of replay of image data, the user electronically scales up or down replayed image. The menu button 107 is a button manipulated by the user when the user wants to display a menu screen. The play button 108 is a button manipulated by the user when the user replays image data recorded in a memory. The closeup shooting button 109 is a button manipulated by the user when the user shoots a close subject such as a close plant. The optical viewfinder 110 is for the user to optically check a field.

Figure 2:
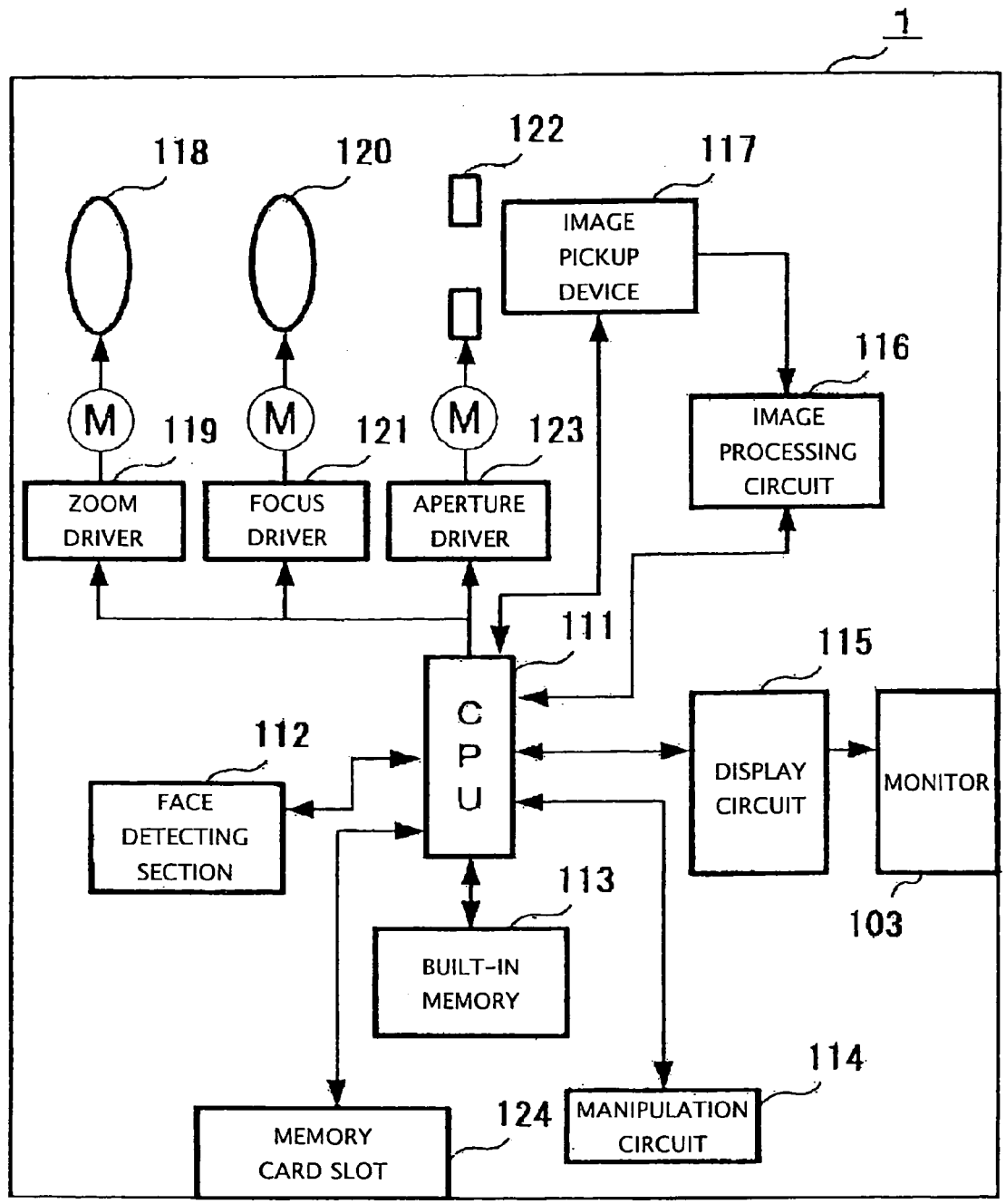
FIG. 2 is a block diagram showing functions of the electronic camera 1 according to the first embodiment.

FIG. 2 is a block diagram showing functions of the electronic camera 1 according to the first embodiment. In FIG. 2, the electronic camera 1 is composed of a CPU 111, a face detecting section 112, a built-in memory 113, a manipulation circuit 114, a display circuit 115, a monitor 103, an image processing circuit 116, an image pickup device 117, a zoom lens 118, a zoom driver 119, a focus lens 120, a focus driver 121, an aperture 122, an aperture driver 123, and a memory card slot 124. Needless to say, there are other circuits to realize functions of the electronic camera but have little relation to the first embodiment, so that a description thereof will be omitted.

The CPU 111 is a circuit which processes programs to realize various functions executed in the electronic camera 1. The CPU 111 executes the programs stored in a memory in the CPU 111, that is, the built-in memory 113 and controls various circuits in the electronic camera 1. The face detecting section 112 extracts a characteristic portion of image data picked up by the image pickup device 117 and detects a face area, face size, and so on of a subject. In FIG. 2, a function block called the face detecting section 112 is described for explanation, but in the first embodiment, a face detection function is realized in software by a face detection program executed by the CPU 111. Of course, it is possible to realize the face detecting section 112 by a hardware circuit.

The built-in memory 113 is a memory to store image data, a control program, and so on. For example, a nonvolatile semiconductor memory is used as the built-in memory 113. The built-in memory 113 stores the face detection program which is executed to detect the face area of the subject. Further, the built-in memory 113 can store face information such as the face position and face size obtained by face detection.

The manipulation circuit 114 detects manipulations of manipulation buttons such as the release button 101, the cruciform key 102, and the decision button 104 provided in the electronic camera 1 and transfers them to the CPU 111. Further, the manipulation circuit 114 detects a half-press manipulation and a full-press manipulation of the release button 101. The display circuit 115 is a circuit to generate image plane data displayed on the monitor 103. The monitor 103 is a liquid crystal display provided on a rear surface of the electronic camera 1. This monitor 103 displays the image plane data generated by the display circuit 115.

A shooting lens is an optical lens to focus a subject image onto a light-receiving plane of the image pickup device 117. This shooting lens is composed of the zoom lens 118, the focus lens 120, and so on. Out of the lenses composing the shooting lens, the zoom lens 118 is a lens to realize scale-up and scale-down of the optical image focused on the image pickup device 117.

This zoom lens 118 is moved by a motor. The zoom driver 119 is a circuit to drive the motor by a command of the CPU 111 and move the zoom lens 119 to a predetermined position. Out of the lenses composing the shooting lens, the focus lens 120 is a lens to adjust focus. This focus lens 120 is moved by a motor. The focus driver 121 is a circuit to drive the motor by a command of the CPU 111 and move the focus lens 120 to a predetermined position.

The aperture 122 is to adjust the amount of light of the field incident on the image pickup device 117. The aperture driver 123 is a circuit to drive a motor by a command of the CPU 111 and control open and closed states of the aperture 122. The image pickup device 117 is a device to convert the optical image inputted through the shooting lens into electric image signals. For example, the image pickup device 118 is composed of a CCD, or the like. The image processing circuit 116 analog-to-digital converts the electric signals outputted from the image pickup device 117 to generate digital signals. Further, the image processing circuit 116 performs interpolation processing or the like on the digital converted signals to generate image data. A memory card is inserted into the memory card slot 124. The memory card slot 124 writes data such as image data in the memory card or deletes data in the memory card.

Next, an operation in the electronic camera 1 according to the first embodiment will be described. A setting manipulation to use the face detection function in the electronic camera 1 will be described. When the main subject is a person, the user of the camera wants to focus on a face portion obtained by face detection. In the electronic camera 1, a result of face detection is used as one of options for deciding an area brought into autofocus (AF).

Figure 3:
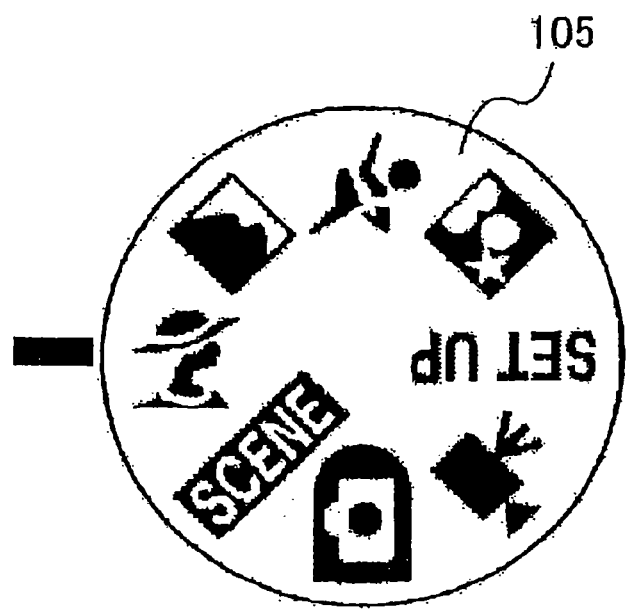
FIG. 3 is views showing a mode select dial 105 for selecting a shooting scene mode and a menu screen corresponding to the selected shooting scene mode.
Figure 3:
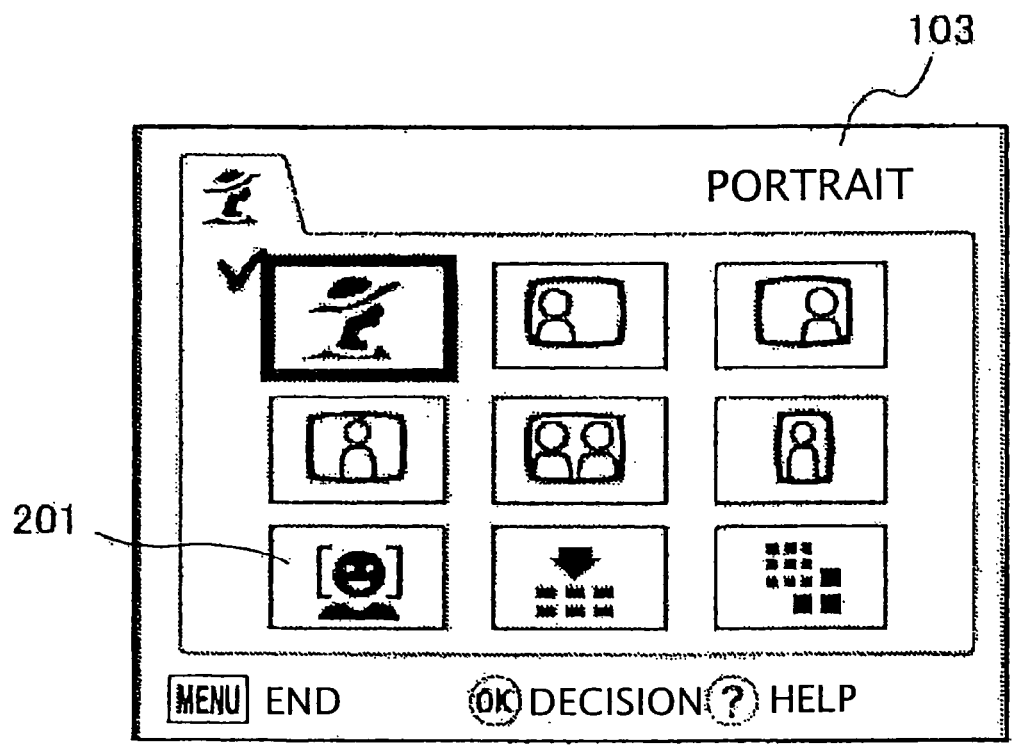
Figure 4:
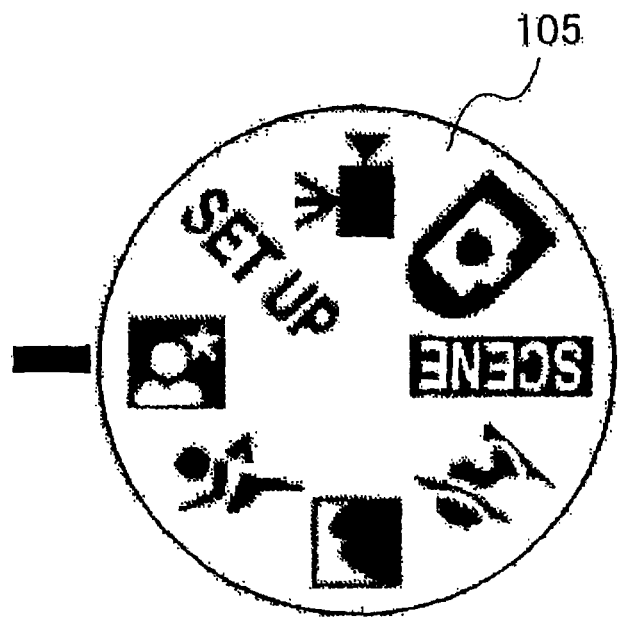
FIG. 4 is views showing the mode select dial 105 for selecting a shooting scene mode and a menu screen corresponding to the selected shooting scene mode.
Figure 4:
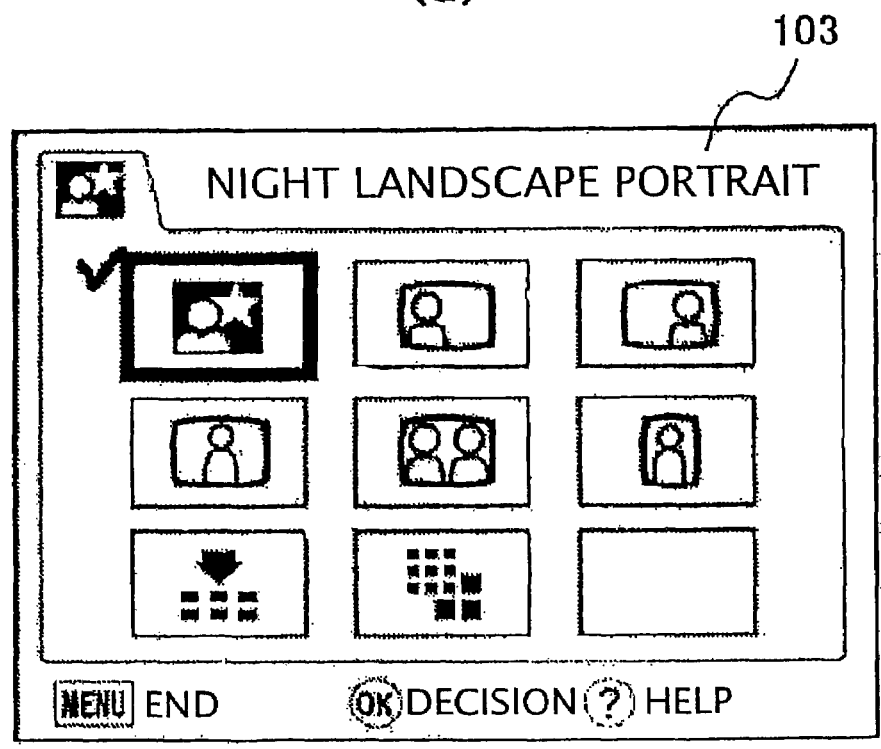

FIG. 3 and FIG. 4 are views each showing the mode select dial 105 to select a shooting scene mode and a menu screen corresponding to the selected shooting scene mode.

FIG. 3A shows the mode select dial 105 in a state where a portrait shooting mode is selected. FIG. 3B shows a menu screen displayed on the monitor 103 when the menu button 107 is manipulated in the portrait shooting mode. The user selects a function icon by manipulating the cruciform key 102 on the menu screen and manipulates the decision button 104. Thus, the electronic camera 1 performs a selected function. An icon 201 in FIG. 3B is an icon selected when a face detection AF function is performed. The operation of face detection AF will be described later.

FIG. 4A shows the mode select dial 105 in a state where a night landscape portrait shooting mode is selected. FIG. 4B shows a menu screen displayed on the monitor 103 when the menu button 107 is manipulated in the night landscape portrait shooting mode. As just shown, in the electronic camera 1 of the first embodiment, the menu screen of the night landscape portrait mode is not provided with the icon 201 which is selectable from the menu screen of the portrait mode.

A person is sometimes shot in the night landscape portrait mode. Therefore, it is effective to detect a face even in the night landscape portrait mode and autofocus on a detected face area. However, to detect the face of the subject, some degree of brightness of a face portion is required, but it is expected that the brightness is not sufficient to detect the face in a scene of the night landscape portrait. Hence, in order to prevent the user from being confused because the face detection is not feasible, the face detection AF is made unsettable in the night landscape portrait mode. Similarly, also when a sport shooting mode is selected via the mode select dial 105, it is difficult to detect a face of a moving person. Therefore, the sport shooting mode is not provided with the icon to select the face detection AF either. This results in avoiding in advance the user from being confused because the user cannot recognize the face.

When the face detection AF of the icon 201 on the menu screen shown in FIG. 3B is selected, the electronic camera 1 performs control so as to focus on the closest face portion of the detected face. When the face detection AF is selected, the electronic camera 1 is automatically switched to a constant AF mode. In the constant AF mode, irrespective of the manipulation of the release button 101, the electronic camera 1 repeats focusing by AF. Then, by half pressing the release button 101, the electronic camera 1 performs control to make an AF lock.

Subsequently, a face detection operation in the electronic camera 1 according to the first embodiment will be described.

In the electronic camera 1, the face detection is performed using a moving image (a through image) picked up by the image pickup device 117. This through image is displayed on the monitor 103 for check-up of a subject image to be shot. Moreover, during the face detection, the electronic camera 1 performs control in such a manner as to increase the brightness of the through image as compared with while the face detection is not performed. Increasing the brightness of the through image makes it easy to detect the face.

Further, the electronic camera 1 repeatedly performs the face detection using the through image until the release button 101 is half pressed. When the face is not detected at this time, the face detection is assisted by performing central-area AF and multi-area AF to bring the subject into focus.

Furthermore, the electronic camera 1 repeatedly stores face detection information such as the face position and face size as a result of the face detection in the built-in memory 113 while overwriting the latest piece thereof until the release button 101 is half pressed. This makes it possible to read and use the preceding detection result stored in the built-in memory 113 even if the face is not detected through the half-press manipulation. Besides, when the face detection information cannot be obtained in the half-press manipulation, the electronic camera 1 forcibly performs AF using another area such as a central area.

Hereinafter, shooting control by the face detection will be specifically described using a flowchart.

Figure 5:
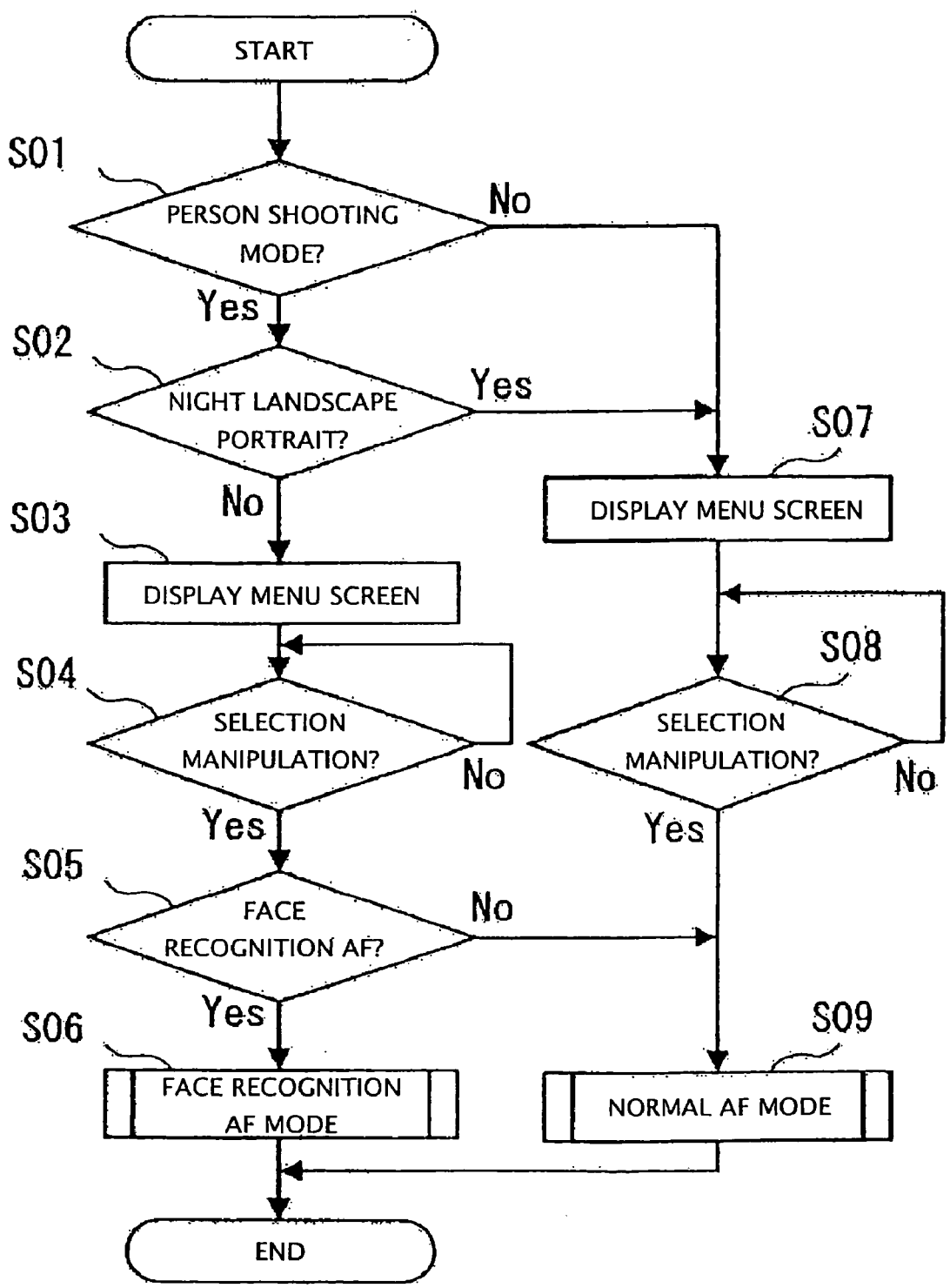
FIG. 5 is a flowchart showing control performed by a CPU 111.

FIG. 5 is a flowchart showing control performed by the CPU 111. The flow shown in FIG. 5 is set to a still image shooting mode, and starts by detecting the manipulation of the menu button 107.

First, in step S01, the CPU 111 detects whether a scene shooting mode in which it is assumed that a person is shot is selected. In the electronic camera 1 of the first embodiment, it is detected whether the portrait mode or the night landscape portrait mode is selected by the mode select dial 105. If it is selected, the CPU 111 goes to step S02. On the other hand, if it is not selected, the CPU 111 goes to step S07. In step S02, the CPU 111 determines whether the selected shooting scene is the night landscape portrait mode. If it is the nigh landscape portrait mode, the CPU goes to step S07. On the other hand, if it is not the night landscape portrait mode, the CPU goes to step S03.

In step S03, the menu screen having the face detection AF as an option which is shown in FIG. 3B is displayed on the monitor 103. Subsequently, in step S04, the CPU 111 detects whether the decision button 104 is manipulated. If the manipulation of the decision button 104 is detected, the CPU 111 goes to step S05. On the other hand, if the manipulation thereof is not detected, the CPU 111 continues the detection. In step S05, the CPU 111 determines whether the face detection AF is selected. If the face detection AF is selected, the CPU 111 goes to step S06. On the other hand, if any option other than the face detection AF is selected, the CPU 111 goes to step S09. In step S06, the CPU 111 controls the electronic camera 1 in a face recognition AF mode. The face recognition AF mode will be described using a flowchart in FIG. 6.

On the other hand, in step S07, the menu screen shown in FIG. 4B is displayed on the monitor 103. Subsequently, in step S08, the CPU 111 detects whether the decision button 104 is manipulated. If the manipulation thereof is detected, the CPU 111 goes to step S09. On the other hand, if the manipulation thereof is not detected, the CPU 111 continues the detection. Then, in step S09, the CPU 111 controls the electronic camera 1 in a normal AF mode.

Through the above control, the face detection is prevented from performed in the night landscape mode in which it is probable that the face cannot be detected, even during the scene shooting mode for shooting a person, which prevents the user from being confused.

Figure 6:
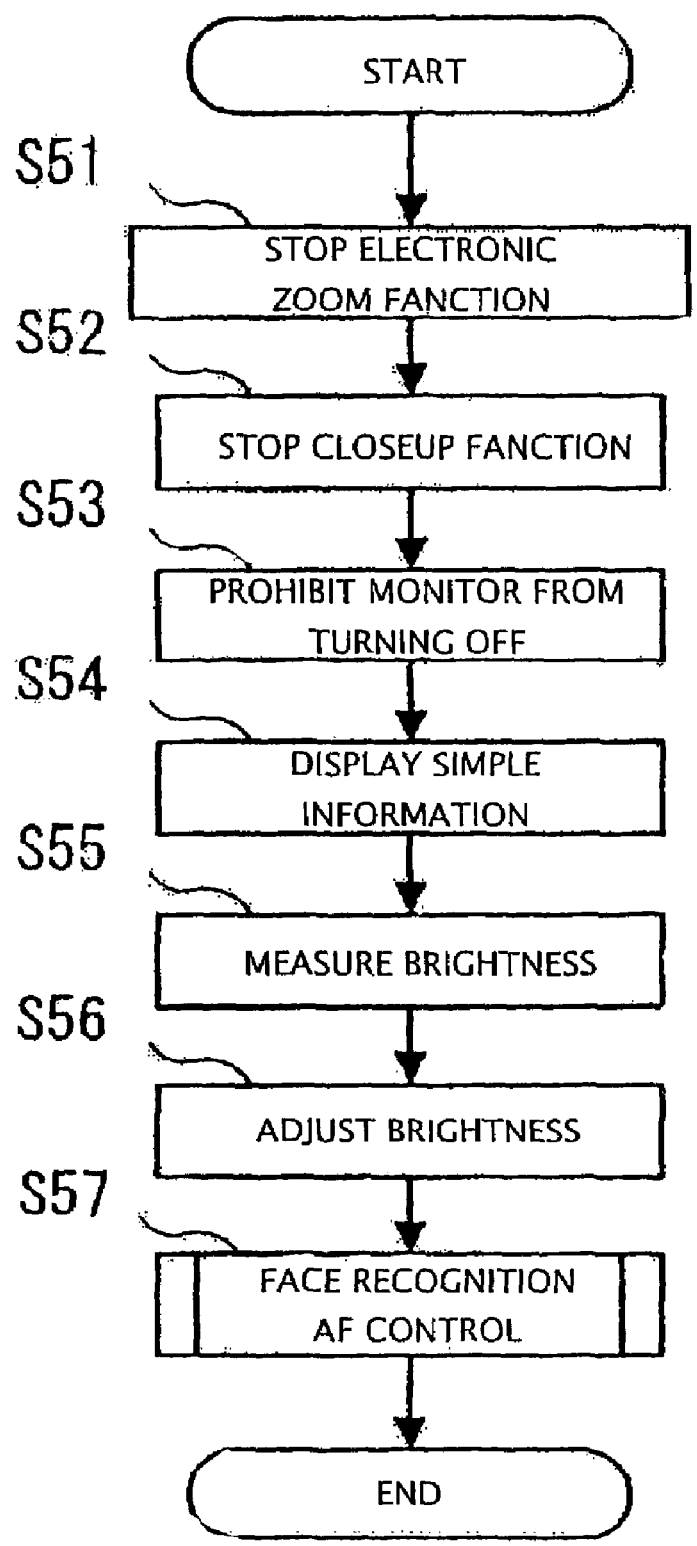
FIG. 6 is a flowchart showing control performed by the CPU 111 in a face recognizing AF mode.

Next, the face recognition AF mode will be described. FIG. 6 is the flowchart showing control performed by the CPU 111 in the face recognition AF mode. This flow is executed in step S06 in FIG. 5.

Figure 11:
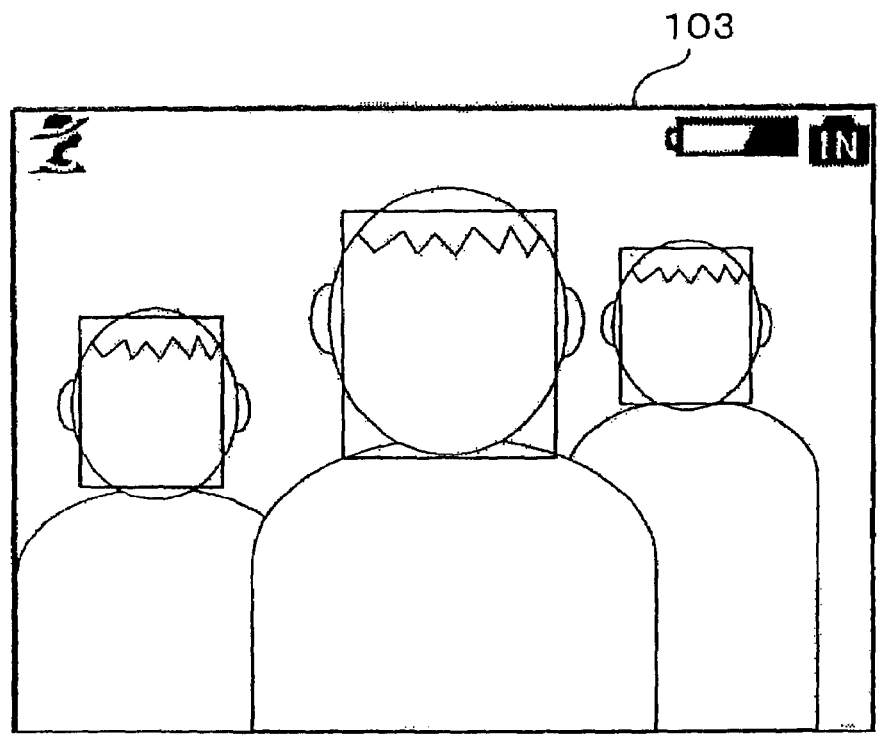
FIG. 11 is a view showing a display example of the image plane displayed on the monitor 103.
Figure 14:
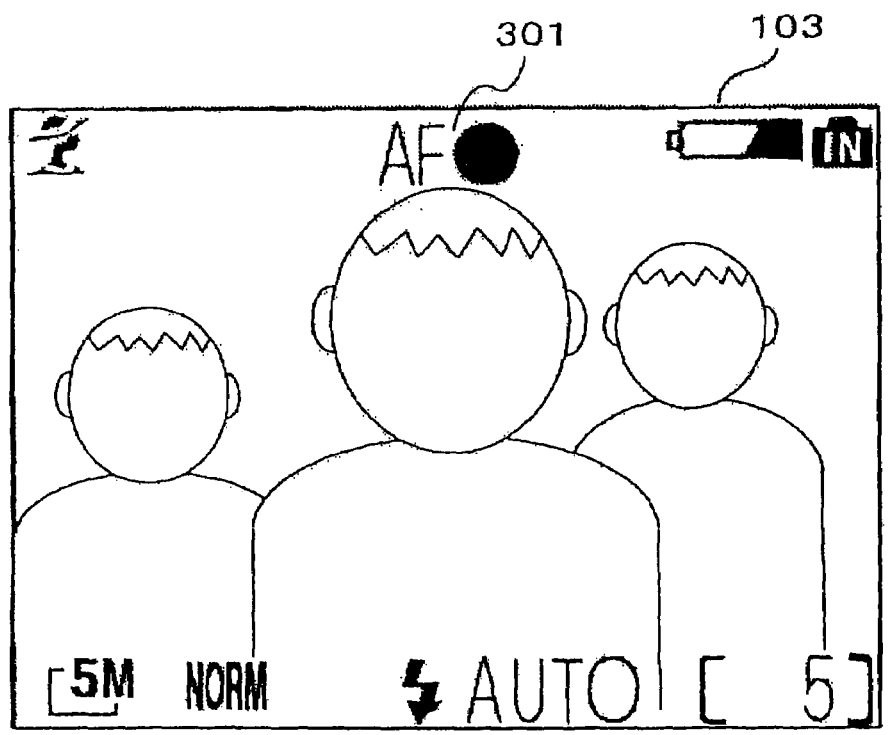
FIG. 14 is a view showing a display example of the image plane displayed on the monitor 103.

First, in step S51, the CPU 111 makes a setting not to perform an electronic zoom function. By preventing the electronic zoom function, the face detection can be continued using the through image. Then, in step S52, the CPU 111 makes a setting not to perform a closeup shooting function. This is because through the closeup shooting only part of the face is shot and the part of the face is not sufficient to detect the face. Subsequently, in step S53, the CPU 111 prohibits the monitor 103 from turning off. Without the monitor 103 being in an on state, the user cannot check up the result of face detection, so that he/she takes a shot even when the face detection of the electronic camera 1 is erroneous. Thereafter, in step S54, the CPU 111 switches the display of the monitor 103 to a simple display. In the simple display, the monitor 103 displays a reduced number of items of shooting information such as a memory remaining capacity indication which is superimposed on image data. A display example of shooting information in the face detection AF mode is shown in FIG. 11. A display example of shooting information in the normal AF mode is shown in FIG. 14. Switching to the simple display such as shown in FIG. 11 can make it easier for the user to check up a face detection frame as much as possible. This is because in the simple display, it is unlikely that the frame displayed when the face is detected overlaps with the display of the shooting information. Moreover, for example, even during the display setting to display the shooting information, the CPU 111 stops the shooting information display. When the shooting information display is not set, it is needless to say that the CPU 111 continues the non-display of the shooting information.

In step S55, the CPU 111 measures the brightness of the field using the image captured by the image pickup device 117. In step S56, the CPU 111 adjusts the brightness based on the measured field brightness. Then, the CPU 111 displays the through image on the monitor 103. In step S57, the CPU 111 performs face detection AF control.

The above control can reduce defects in the face detection AF mode and user's dissatisfaction.

Figure 7:
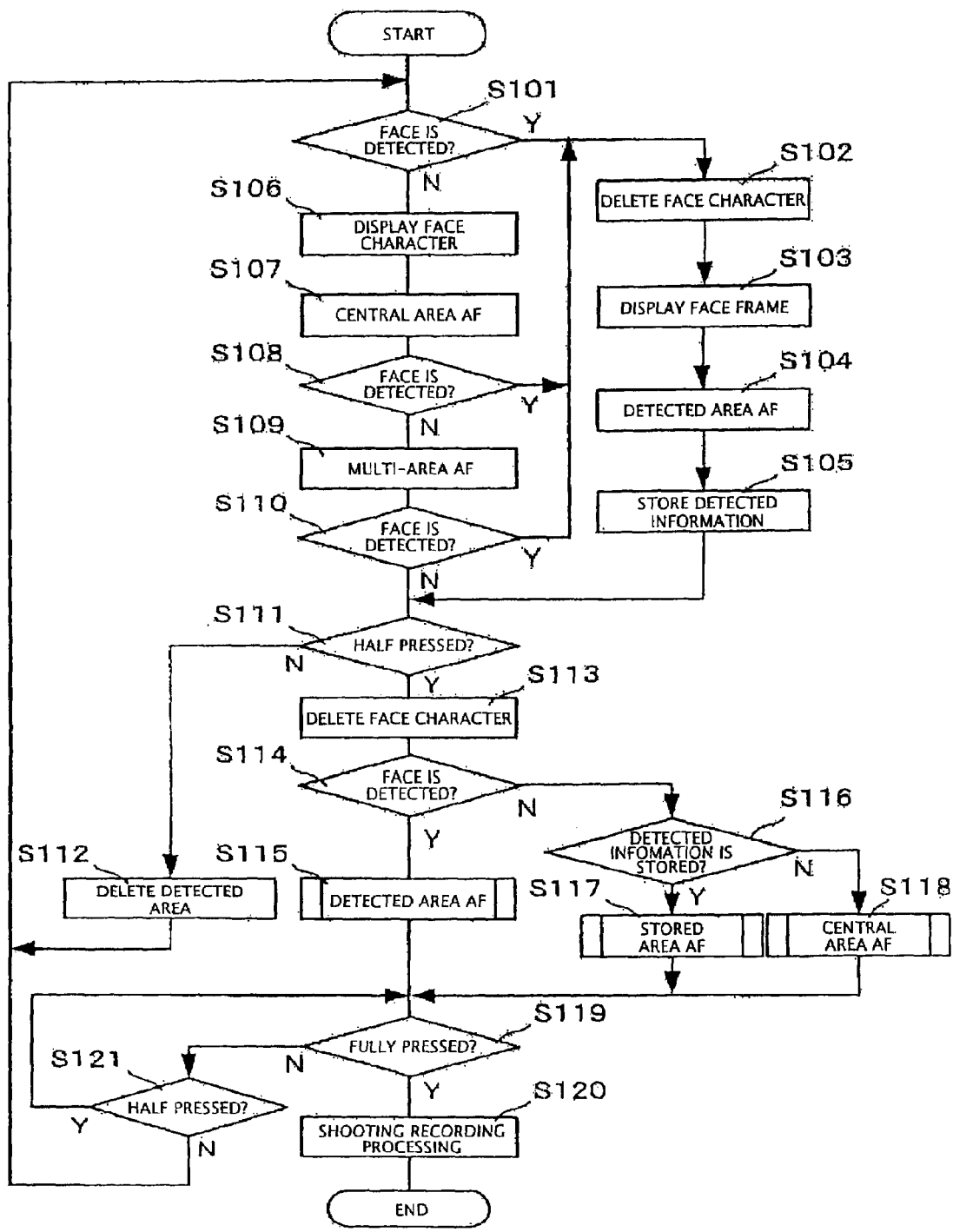
FIG. 7 is a flowchart showing face detection AF control performed by the CPU 111.

Next, the face detection AF control will be described. FIG. 7 is a flowchart showing the face detection AF control performed by the CPU 111. This flow is executed in step S57 in FIG. 6.

Figure 10:
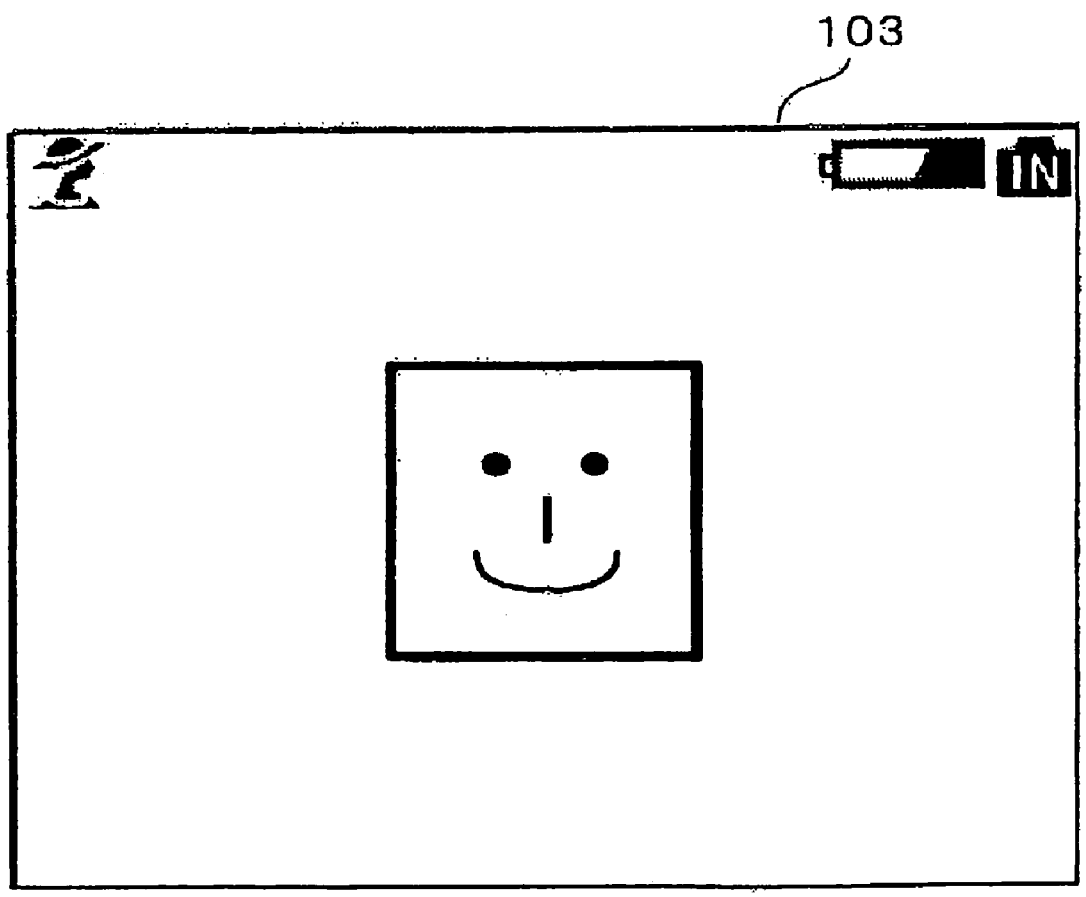
FIG. 10 is a view showing a display example of an image plane displayed on a monitor 103.

First, in step S101, the CPU 111 determines whether the face is detected. If the face is detected, the CPU 111 goes to step S102. On the other hand, if the face is not detected, the CPU 111 goes to step S106. In step S102, if a face character shown in FIG. 10 is displayed while being superimposed on the subject image on the monitor 103, the CPU 111 deletes the display of the face character. Then, in step S103, the CPU 111 sets an area depending on the position and size of the detected face, and as shown in FIG. 11, displays frames while superimposing them on the subject image on the monitor 103. If the number of detected faces is plural, a frame is displayed on each face. In step S104, the CPU 111 performs AF in the set area. In step S105, the CPU 111 temporarily stores detected face information in the built-in memory 113. By storing the detected face information here, the CPU 111 can decide an AF area by using the face information stored in the built-in memory 113 when the face is not detected in the half-press manipulation in which the AF area is finally decided. The face information stored in the built-in memory 113 is overwritten with new face information in the next face detection.

On the other hand, in step S106, the CPU 111 displays the face character shown in FIG. 10 while superimposing it on the subject image on the monitor 103. The display of the face character indicates the user that the face detection AF mode is being performed, and informs the user of the size of the face ideal for the face detection control by the size of the face character. Incidentally, it is not necessary to display the face character constantly, and it is only required to display it every several seconds. Then, in step S107, the CPU 111 performs AF in an AF area in which a central area is weighted. There is a possibility that although the person is within the field, the face is too blurred to be detected, and hence, the face detection is assisted by focusing on the subject image in a central portion with a high possibility that the main subject is there to focus. In step S108, the CPU 111 determines again whether the face is detected. If the face is not detected, the CPU 111 goes to step S109. On the other hand, if the face is detected, the CPU goes to step S102. In step S109, the CPU 111 performs multi-area AF. Similarly to AF in the central area in step S107, a face of a person outside the central portion can be detected.

Next, in step S110, the CPU 111 determines again whether the face is detected. If the face is not detected, the CPU 111 goes to step S111. On the other hand, if the face is detected, the CPU 111 goes to step S102. In step S111, the CPU 111 detects whether the release button 101 is half pressed. If the half-press manipulation is detected, the CPU 111 goes to step S113.

On the other hand, if the half-press manipulation is not detected, the CPU 111 goes to step S112.

In step S112, the CPU 111 deletes the face information stored in the built-in memory 113 and returns to step S101.

In step S113, if the face character is displayed while being superimposed on the subject image on the monitor 103, the CPU 111 deletes the display of the face character. Then, in step S114, the CPU 111 determines whether the face is detected in order to specify the face which is regarded as a final AF area. If the face is detected, the CPU 111 goes to step S115. On the other hand, if the face is not detected, the CPU 111 goes to step S116. In step S115, the CPU 111 sets an area set according to the position and size of the detected face as the final AF area, and performs AF control. This AF control in the area detected by the face detection will be described later using FIG. 8. In step S116, the CPU 111 detects whether there is the face information stored in step S107 in the memory. With the face information therein, the CPU 111 goes to step S117. On the other hand, without the face information therein, the CPU 111 goes to step S118.

In step S117, the CPU 111 sets an area based on the stored face information as the AF area and performs AF control. The AF control in the area detected by the stored face detection will be described later using FIG. 8. Therefore, if the face is not detected in the half-press manipulation, the face area detected immediately therebefore with little time difference is used as the AF area. This makes it possible to focus on the face portion almost without fail. In particular, this can respond to one-press manipulation in which the release button 101 is fully-pressed with one press. In step S118, the CPU 111 performs AF control with the central area as the AF area. The AF control in the central area will be described later using FIG. 9. Consequently, when the face is not detected, the central area which is likely to include the main subject is automatically used as the AF area. This increases a possibility that the main subject comes into focus. Moreover, it becomes unnecessary for the user to return to the menu screen and reset the AF area, which prevents a photo opportunity from being missed.

In step S119, the CPU 111 detects whether the release button 101 is fully pressed. If the release button 101 is fully pressed, the CPU 111 goes to step S120. On the other hand, if it is not fully pressed, the CPU 111 goes to step S121. In step S120, the CPU 111 performs shooting and recording processing. In step S121, the CPU 111 detects whether the release button 101 is half pressed. If the release button 101 is half pressed, the CPU 111 returns to step S119. On the other hand, if it is not half pressed, the CPU 111 returns to step S101.

Figure 8:
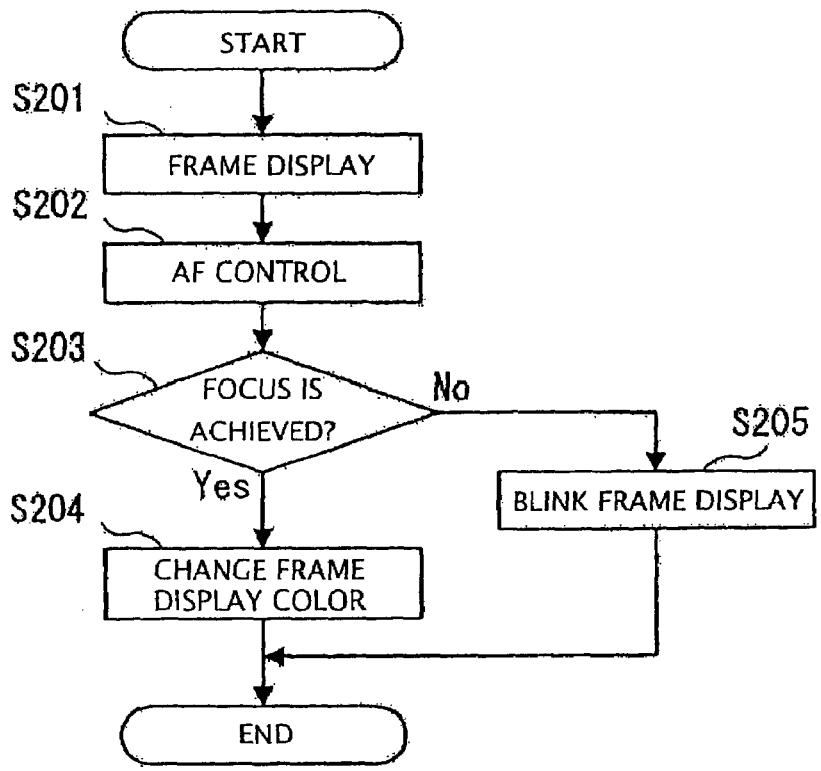
FIG. 8 is a flowchart showing AF control by a detection area performed by the CPU 111.

Next, the AF control in the detected area where the face has been detected will be described. FIG. 8 is a flowchart showing the AF control in the detected area performed by the CPU 111. This flow is executed in step S115 and step S117 in FIG. 7.

Figure 12:
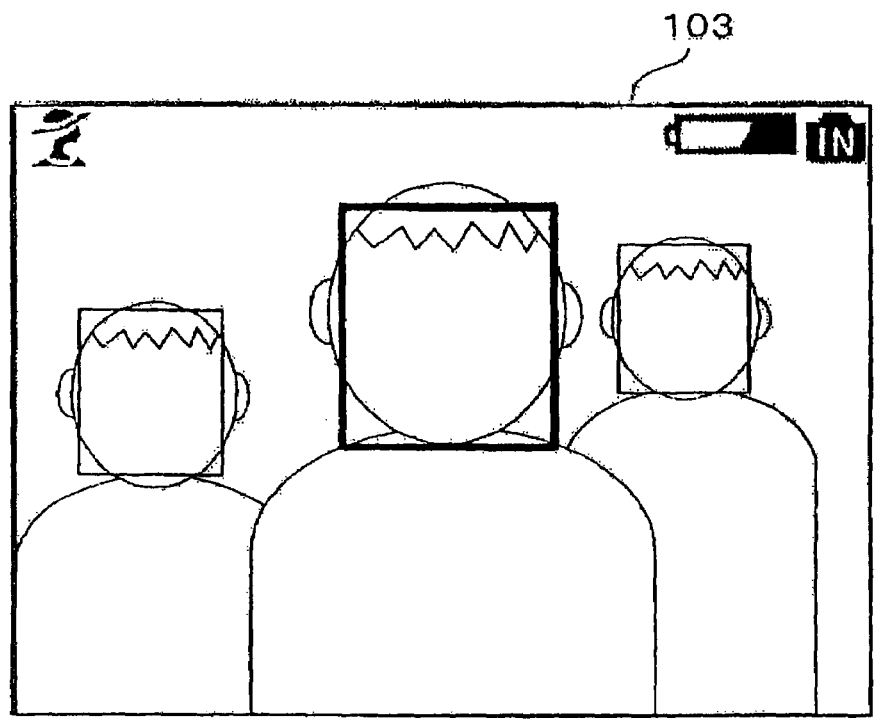
FIG. 12 is a view showing a display example of the image plane displayed on the monitor 103.
Figure 13:
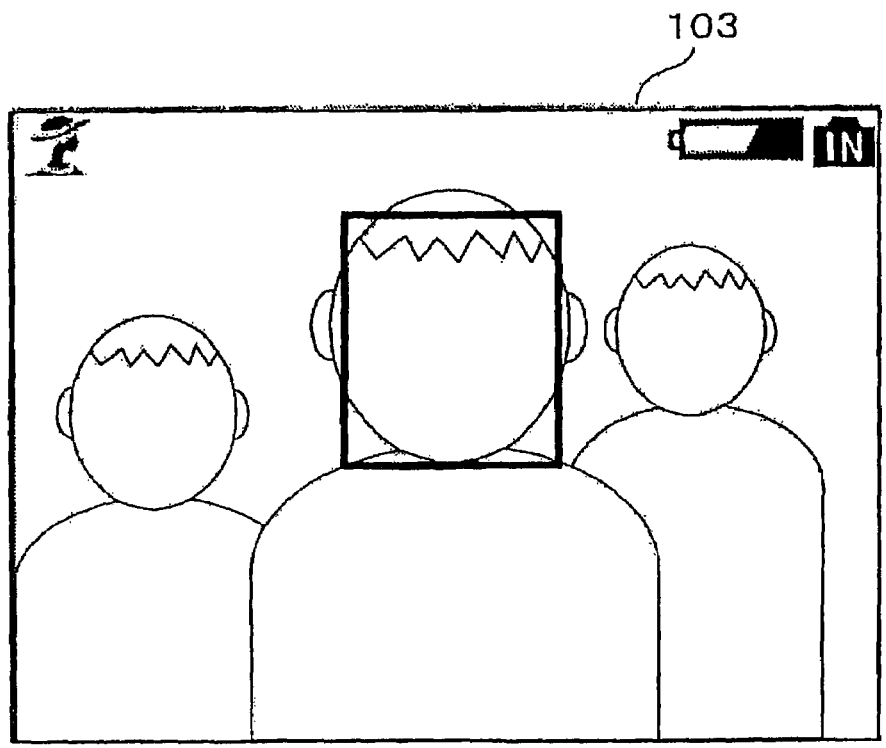
FIG. 13 is a view showing a display example of the image plane displayed on the monitor 103.

First, in step S201, the CPU 111 displays a face detected area frame set corresponding to the position and size of the detected face while superimposing it on the through image as shown in FIG. 12. When plural faces are detected, frames are displayed on the respective faces. Then, the frame of the largest or closest face is switched from a white frame (a thin-line frame in FIG. 11) to a red frame (a thick-line frame in FIG. 12). Subsequently, in step S202, the CPU 111 sets the area displayed by the red frame in FIG. 12 to the AF area and performs AF control. Thereafter, in step S203, the CPU 111 detects whether focus is achieved. If focus is achieved, the CPU 111 goes to step S204. On the other hand, if focus is not achieved, the CPU 111 goes to step S205. In step S204, the CPU 111 switches the frame shown by the thick-line frame in FIG. 12 from the red frame to a blue frame. This makes it possible to inform the user that focus is achieved. Moreover, as shown in FIG. 13, a frame display which is not to the AF area may be deleted. Meanwhile, in FIG. 205, the CPU 111 displays the frame shown by the thick-line frame in FIG. 12 which remains the red frame in a blinking state. This makes it possible to inform the user that focus is not achieved.

Figure 9:
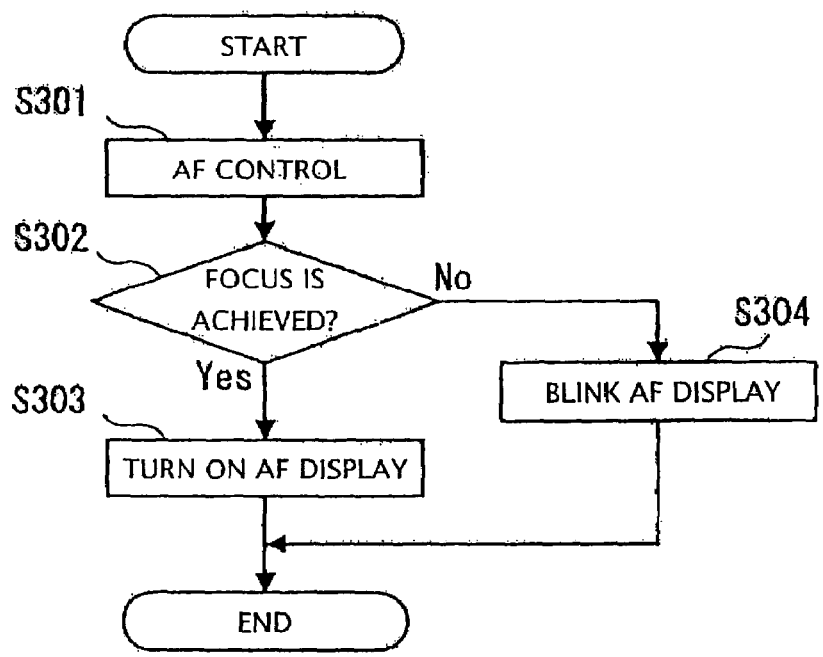
FIG. 9 is a flowchart showing AF control, in which a central area is weighted, performed by the CPU 111.

Next, the AF control in step S118 in FIG. 7 will be described. FIG. 9 is a flowchart showing the AF control in which the central area is weighted performed by the CPU 111. This flow is executed in step S118 in FIG. 7.

First, in step S301, the CPU 111 performs the AF control with the central area being weighted. Then, in step S302, the CPU 111 detects whether focus is achieved. If focus is achieved, the CPU 111 goes to step S303. On the other hand, if focus is not achieved, the CPU 111 goes to step S304. In step S303, the CPU 111 displays an icon 301 shown in FIG. 14 in an on-state while superimposing it on the subject image on the monitor 103. This makes it possible to inform the user that focus is achieved in an area other than the face detected area. On the other hand, in step S304, the CPU 111 displays the icon 301 shown in FIG. 14 in a blinking state while superimposing it on the subject image on the monitor 103. This makes it possible to inform the user that focus is not achieved in the area other than the face detected area.

Description of Second Embodiment

Figure 15:
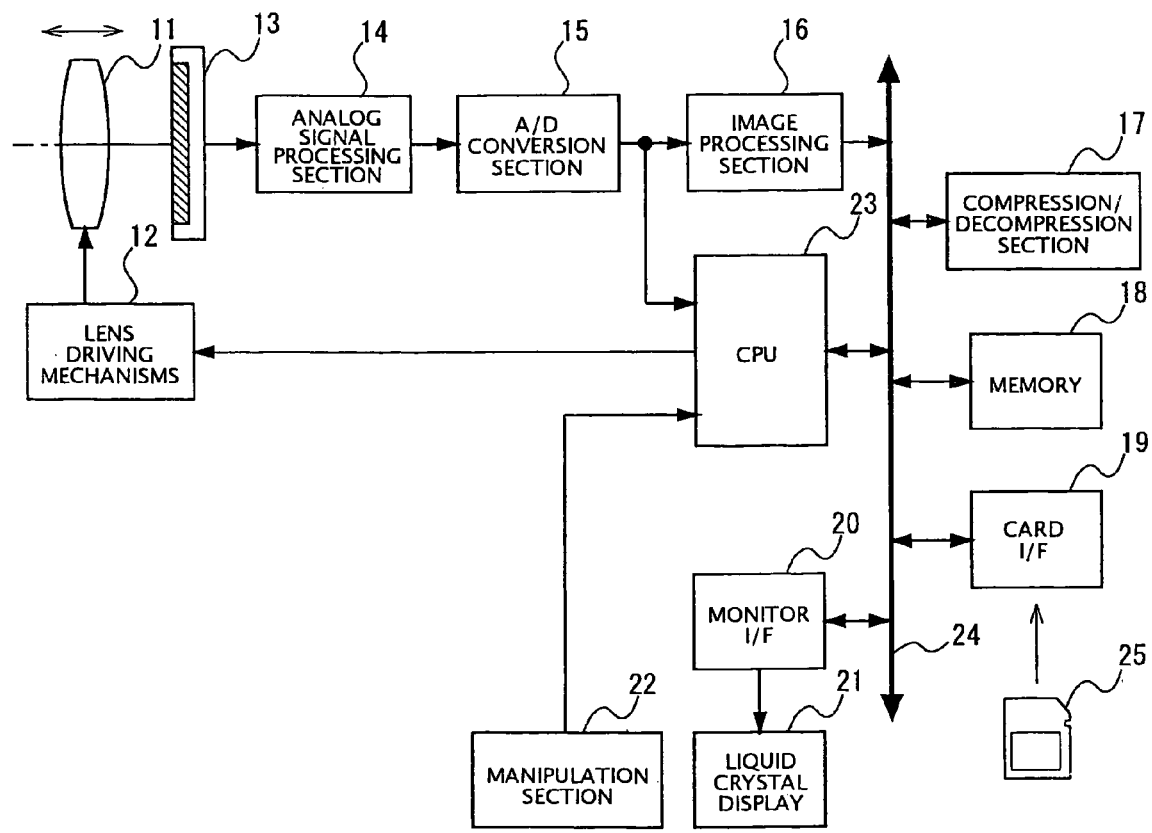
FIG. 15 is a block diagram showing an overview of an electronic camera of a second embodiment.

FIG. 15 is a block diagram showing an overview of an electronic camera of a second embodiment. The electronic camera of the second embodiment includes a shooting lens 11, lens driving mechanisms 12, an image pickup device 13, an analog signal processing section 14, an A/D conversion section 15, an image processing section 16, a compression/decompression section 17, a memory 18, a card I/F 19, a monitor I/F 20 and a liquid crystal display 21, a manipulation section 22, a CPU 23, and a bus 24. Incidentally, the image processing section 16, the compression/decompression section 17, the memory 18, the card I/F 19, the monitor I/F 20, and the CPU 23 are connected respectively via the bus 24.

The shooting lens 11 is composed of a group of plural lenses including a focusing lens for adjusting the focusing position. The position of this shooing lens 11 in an optical axis direction is adjusted by the lens driving mechanisms 12.

The image pickup device 13 is placed on the image space side of the shooting lens 11. Photodetectors which photoelectrically convert the subject image to generate analog image signals are two-dimensionally arranged on a light-receiving plane (a plane facing the shooting lens 11) of the image pickup device 13. An output of the image pickup device 13 is connected to the analog signal processing section 14.

Further, even when a shutter is not released, the image pickup device 13 exposes the subject at predetermined intervals and outputs the analog image signals (through image signals) by thinning-out reading or the like. This through image signal is used for AF calculation, AE calculation, and face recognition by the CPU 23, generation of a viewfinder moving image by the image processing section 26, and so on. Incidentally, the image pickup device 13 of the second embodiment may adopt either a sequential charge transfer method (for example, a CCD) or an XY address method (for example, a CMOS).

The analog signal processing section 14 is composed of a CDS circuit which performs correlated double sampling, a gain circuit which amplifies the outputs of the analog image signals, a clamp circuit which clamps the waveform of an input signal at a fixed voltage level, and so on. The A/D conversion section 15 converts the analog image signals outputted from the analog image processing section 14 into digital image signals. An output of the A/D conversion section 15 is connected to the image processing section 16 and the CPU 23, respectively.

The image processing section 16 performs image processing (defective pixel correction, gamma correction, interpolation, color conversion, edge enhancement, and so on) on the digital image signals when the shutter is released to generate shooting image data. Further, the image processing section 16 generates viewfinder images sequentially based on the digital image signals (through image signals) when the shutter is not released.

Figure 18:
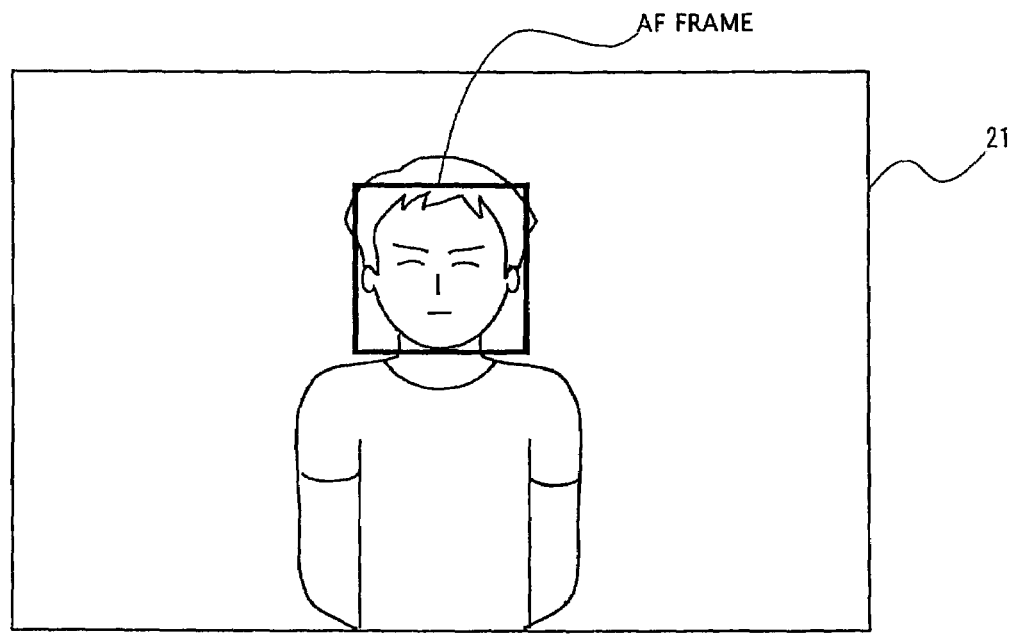
FIG. 18 is a view showing a viewfinder image at the time of face recognition in the second embodiment.

Furthermore, the image processing section 16 combines and displays a rectangular AF frame showing a face area as an AF target with the viewfinder image based on face recognition information described later (See FIG. 18). Besides, the image processing section 16 gives an indication of focusing failure to the viewfinder image using the above AF frame based on focusing failure information described later. Examples of this indication of focusing failure are a way of displaying the AF frame in a blinking state, a way of making a change to the color of the AF frame in a normal state, and so on. Incidentally, when the AF calculation is made twice and each ends in focusing failure as described later, the image processing section 16 gives different indications of focusing failure respectively for the first and second times.

The compression/decompression section 17 performs processing of compressing the shooting image data after image processing in a JPEG format and processing of decompressing and reconstructing the image data compressed in the JPEG format. The memory 18 is composed of an SDRAM or the like and has a capacity capable of recording image data corresponding to plural frames. Image data before and after the image processing by the image processing section 16 is temporarily stored in this memory 18.

A connector to connect storage media 25 is formed in the card I/F 19. The storage media 25 are composed of a publicly known semiconductor memory and the like, and the above shooting image data is finally stored in the storage media 25. Incidentally, the shooting image data generated in the second embodiment conforms to the Exif (Exchangeable image file format for digital still cameras) standard, and a main body of the shooting image data and supplementary information (shooting information and so on) on the shooting image data are stored in association with each other.

The liquid crystal display 21 is connected to the monitor I/F 20. The liquid crystal display 21 is mainly placed at a rear portion of the electronic camera. The viewfinder images sequentially outputted from the image processing section 16 are displayed by moving images on the liquid crystal display 21 during shooting. A replay image plane of the shooting image data, a setting image plane to change various kinds of settings of the electronic camera, and so on are also displayed on the liquid crystal display 21.

The manipulation section 22 includes an input button to perform switching between various kinds of shooting modes (such as a shooting mode and a replay mode) of the electronic camera and input settings, a release button, and so on.

The CPU 23 controls the operation of each section of the electronic camera according to a sequence program stored in a ROM not shown. For example, the CPU 23 performs an AE calculation, a calculation of a white balance gain, and so on based on the through image signals. The CPU 23 generates the supplementary information on the shooting image data based on the Exif standards when the shutter is released. Especially in the second embodiment, the CPU 23 has the following functions.

First, the CPU 23 performs publicly known face recognition processing on the through image signals to detect a face area of a person within the image shooting plane. Then, the CPU 23 generates face recognition information indicating the position of the face area within the shooing image plane. In the second embodiment, the CPU 23 also detects a vertical direction of the face based on the positional relationship among face parts (eyes, a nose, a mouth, and so on) at the time of face recognition.

Incidentally, as an example of the face recognition processing, in Japanese Unexamined Patent Application Publication No. 8-63597, (1) a method of extracting a contour of a flesh-colored area based on color and detecting a face by the degree of matching with a face contour template which is prepared in advance, (2) a method of finding an eye candidate area and detecting a face by the degree of matching with an eye template, (3) a method of finding a feature quantity defined from a two-dimensional Fourier transform result of a face candidate area found by a face contour template and a two-dimensional Fourier transform result of a face template image including eyes, a nose, a mouth, and so on which is prepared in advance and detecting a face by subjecting the feature amount to threshold processing, and the like are disclosed.

Figure 17:
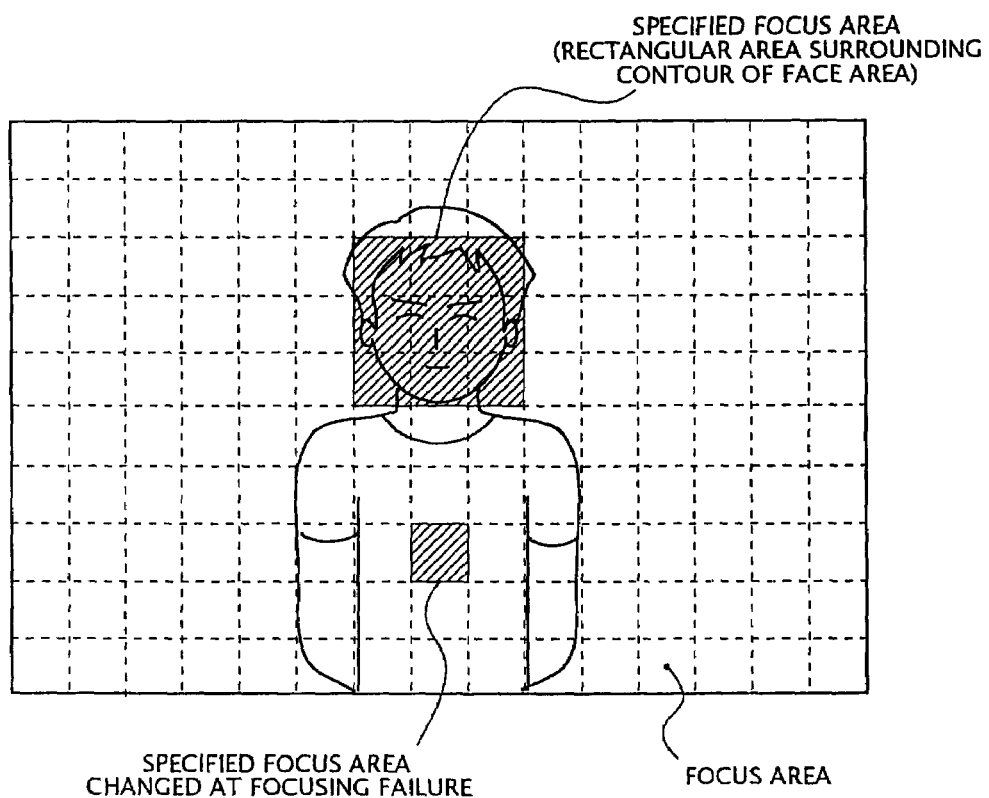
FIG. 17 is a view showing the position of a specified focus area in the second embodiment.

Secondly, the CPU 23 performs a contrast detection system AF calculation based on through image signals of a specified focus area located in the image shooting plane. Here, the CPU 23 selects the specified focus area from among plural focus areas (a group of focus areas) arranged regularly within the image shooting plane based on the face recognition information. In the second embodiment, all of the focus areas located within a rectangular area which surrounds the contour of the face area compose the specified focus area. In the second embodiment, the specified focus area is set to match the range of the above AF frame. Incidentally, the range of the specified focus area rarely perfectly matches the face area, whereby a surrounding portion adjacent to the face area is included in the specified focus area, which causes a high contrast in a contour portion of the face area (See FIG. 17).

Moreover, in the second embodiment, when the focusing position is not detected by the first AF calculation (the specified focus area including the face area), the CPU 23 changes the focus area (focus area which is likely to include the body of the subject) located under the face area to the specified focus area. Note that, this change of the specified focus area is set with reference to the vertical direction of the face detected using the face parts by the CPU 23.

Here, the contrast detection system AF calculation is performed based on a principle that there is a correlation between the degree of the blur and the contrast of the image, and the contrast of the image becomes maximum when focus is achieved. More specifically, the CPU 23 first extracts a high-frequency component in a predetermined band by a band-pass filter from the through-image signals corresponding to the specified focus area. The CPU 23 then generates a focus evaluation value regarding the subject image in the specified focus area by integrating an absolute value of the high-frequency component. This focus evaluation value is maximum when the contrast is maximum at a focusing position.

Thereafter, the CPU 23 moves the focusing lens in a predetermined direction and compares focus evaluation values before and after the movement. If the focus evaluation value after the movement is larger, the contrast is regarded as trending higher, and the CPU 23 moves the focusing lens further in the same direction and performs the same calculation. On the other hand, if the focus evaluation value after the movement is smaller, the contrast is trending lower, and the CPU 23 moves the focusing lens in an opposite direction and performs the same calculation. By repeating the above processing, the CPU 23 searches for a peak of the focus evaluation value (a focusing position). The above operation is generally called a hill-climbing operation. Incidentally, if the focusing position is not detected in the specified focus area, the CPU 23 outputs focusing failure information to the image processing section 16.

Figure 16:
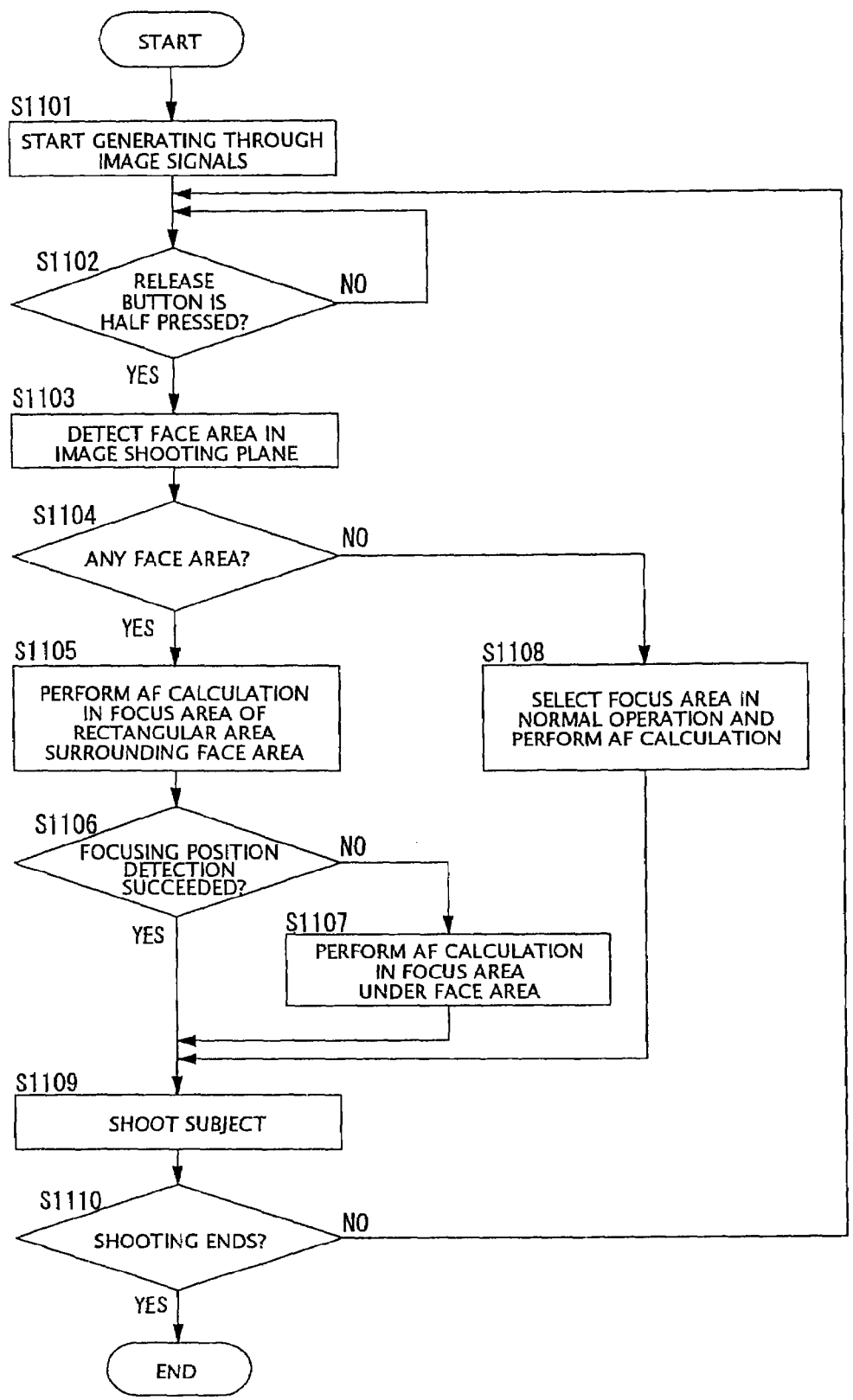
FIG. 16 is a flowchart showing a shooting operation in the second embodiment.

The shooting operation in the second embodiment will be described below with reference to a flowchart in FIG. 16.

Step S1101: The CPU 23 allows the image pickup device 13 to generate the through image signal at predetermined intervals. The image processing section 16 generates a viewfinder image based on the through image signals. The CPU 23 displays the viewfinder image by the moving image on the liquid crystal display 21. Accordingly, the user can frame the subject by the viewfinder image displayed on the liquid crystal monitor 21.

Step S1102: The CPU 23 determines whether the release button is half pressed. If the release button is half pressed (YES side), the CPU 23 goes to S1103. On the other hand, if no force is applied to the release button (NO side), the CPU 23 stands by until the release button is half pressed.

Step S1103: The CPU 23 detects the face area of the subject within the image shooting plane based on the through image signals. Then, the CPU 23 generates the face recognition information when there is a face area within the image shooting plane.

Step S1104: The CPU 23 determines whether the face area is detected in S1103. If the face area is detected (YES side), the CPU 23 goes to S1105. On the other hand, if the face area is not detected (NO side), the CPU 23 goes to S1108.

Step S1105: The CPU 23 sets the focus areas within a rectangular area which surrounds the contour of the face area to the specified focus area (See FIG. 17). Then, the CPU 23 performs the AF calculation by the hill-climbing operation based on the through image signals of the specified focus area. Incidentally in the AF calculation in S1105, the image processing section 16 combines and displays the AF frame with the face area in the viewfinder image (See FIG. 18).

Step S1106: The CPU 23 determines whether the focusing position is detected in the specified focus area (S1105). If the focusing position is detected (YES side), the CPU 23 goes to S1109. On the other hand, if the focusing position is not detected (NO side), the CPU 23 generates the focusing failure information and goes to S1107.

Step S1107: In this case, the CPU 23 changes the focus area located under the face area to the specified focus area. Then, the CPU 23 performs again the AF calculation in the specified area after the change, and thereafter goes to S1109. Also when the focusing position is not detected by this second AF calculation, the CPU 23 generates the focusing failure information. Incidentally, in the AF calculation in S1107, the image processing section 16 gives the indication of focusing failure by the AF frame of the viewfinder image based on the first or second focusing failure information.

Step S1108: Meanwhile, in this case, there is no person within the image shooting plane or the face of the person as the subject is not detected. Therefore, the CPU 23 selects the focus area in the normal operation and performs the AF calculation.

Step S1109: Then, the CPU 23 shoots the subject and generates the shooting image data by the user fully pressing the release button. Incidentally, by using a MakerNote tag of the Exif standard when the shooing image data is generated, the CPU 23 records supplementary information such as the presence or absence of face recognition and the position of the specified focus area used for the AF calculation in the shooting image data.

Step S1110: The CPU 23 determines whether there is a shooting ending instruction inputted by the user. If there is the shooting ending instruction (YES side), the CPU 23 stops the generation of the through image signals and so on, and ends the shooting. On the other hand, if there is no shooting ending instruction (NO side), the CPU 23 returns to S1102 and repeats a series of operations. The above is the description of the shooting operation of the second embodiment.

Next, effects of the above second embodiment will be described.

(1) In the second embodiment, the CPU 23 performs the AF calculation in the specified focus area including the contour of the face area, whereby the person in the image shooting plane can be easily brought into focus. Especially in the specified focus area, a high contrast occurs in the contour portion of the face area. Accordingly, compared with when the focus is detected only in a portion with a low contrast within the face area, a search for a contrast peak becomes easier in the second embodiment. Namely, focusing accuracy in the face of the subject increases. Moreover, the detection of the contour of the face area is relatively easy, which reduces a possibility that the focusing accuracy is influenced by the expression of the face of the subject.

(2) In the second embodiment, when the focusing position is not detected by the first AF calculation with the face area as the specified focus area, the CPU 23 performs the second AF calculation in the specified area where the body of the person is located (S1107). Accordingly, even if focus cannot be achieved in the face area, the person as the subject can be brought into focus with a high probability. The CPU 23 estimates the position of the body from the direction of the face and sets the second specified focus area. Accordingly, in the second AF calculation, the stable focusing accuracy can be ensured regardless of a shooting attitude the electronic camera such as the normal position or vertical position.

(3) In the second embodiment, for the AF calculation the AF frame is combined with the face area in the viewfinder image for display (S1105). Hence, the user can easily keep track of the person as an AF target from the viewfinder image on the liquid crystal display 21. Further, in the second AF calculation, the viewfinder image is displayed with the indication of focusing failure using the AF frame (S1107). The first and second focusing failure displays are different, so that the user can relatively easily judge whether the person is brought into focus from the display state of the AF frame.

(4) In the second embodiment, the shooting image data contains the supplementary information such as the presence or absence of face recognition, the position of the specified focus area used for the AF calculation. Accordingly, referring to the supplementary information of the shooting image data with a viewer such as a personal computer, the user can know the situation at the time the shooting was made ex post facto.

Description of Third Embodiment

Figure 19:
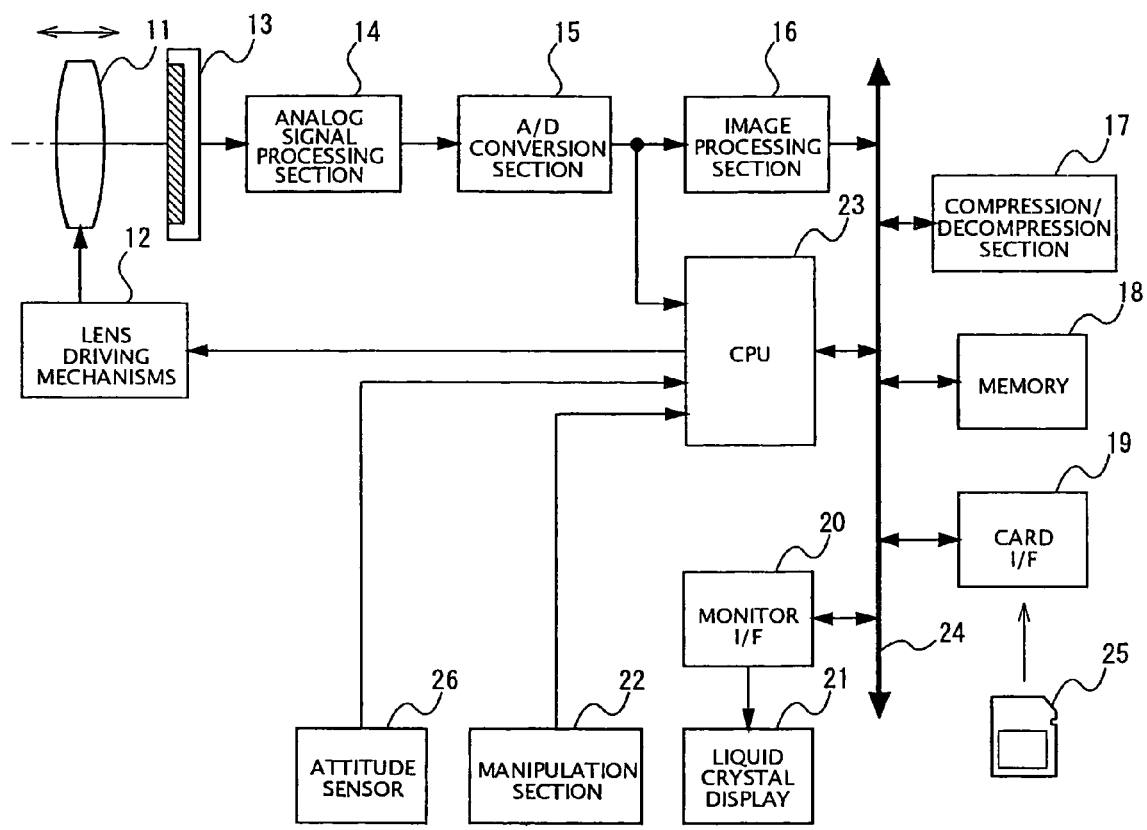
FIG. 19 is a block diagram showing an overview of an electronic camera of a third embodiment.

FIG. 19 is a block diagram showing an overview of an electronic camera of a third embodiment. In the description of the following embodiments, the same numerals and symbols are used to designate components common to the second embodiment, and a description thereof will be omitted.

The third embodiment is a modified example of the second embodiment, and its configuration differs from that of the second embodiment in that an attitude sensor 26 is connected to the CPU 23. The attitude sensor 26 detects a shooting attitude in which the electronic camera is held in a normal position, an upper right vertical position shooting attitude in which the right side of the electronic camera is located at an upper position, an upper light vertical shooting attitude in which the left side of the electronic camera is located at an upper position, and an inverted position shooting attitude in which the electronic camera is inverted. When the focusing position is not detected in the specified focus area including the face area, the CPU 23 changes the focus area located under the face area to the specified focus area based on an output of the attitude sensor 26.

In the third embodiment, almost the same effects as in the first embodiment can be obtained. Furthermore, since the position of the specified focus area is changed by the output of the attitude sensor 26, it is possible to reduce the calculation load of the CPU 23 regarding the detection of the face in the vertical direction.

Description of Fourth Embodiment

Figure 20:
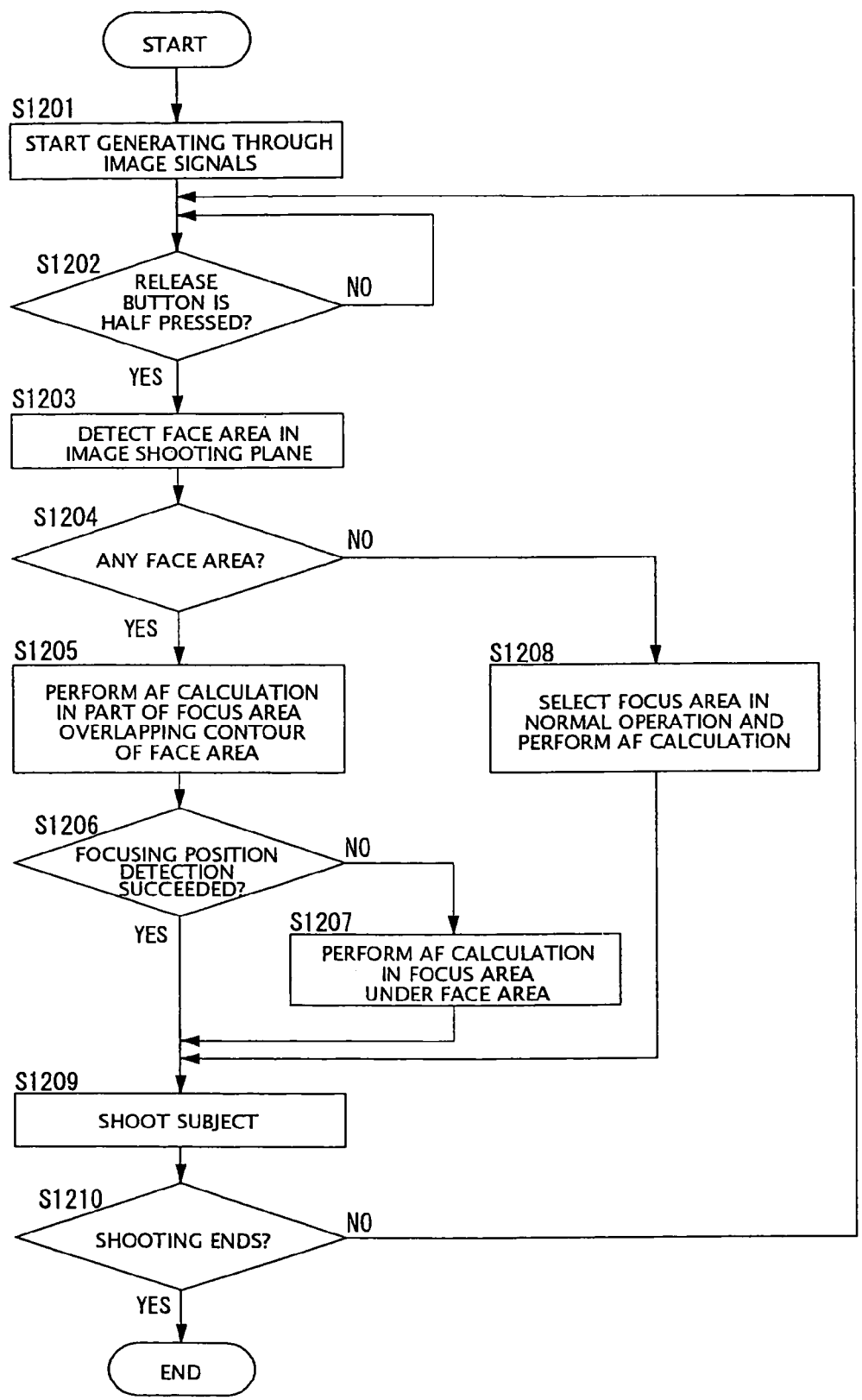
FIG. 20 is a flowchart showing a shooting operation in a fourth embodiment.
Figure 21:
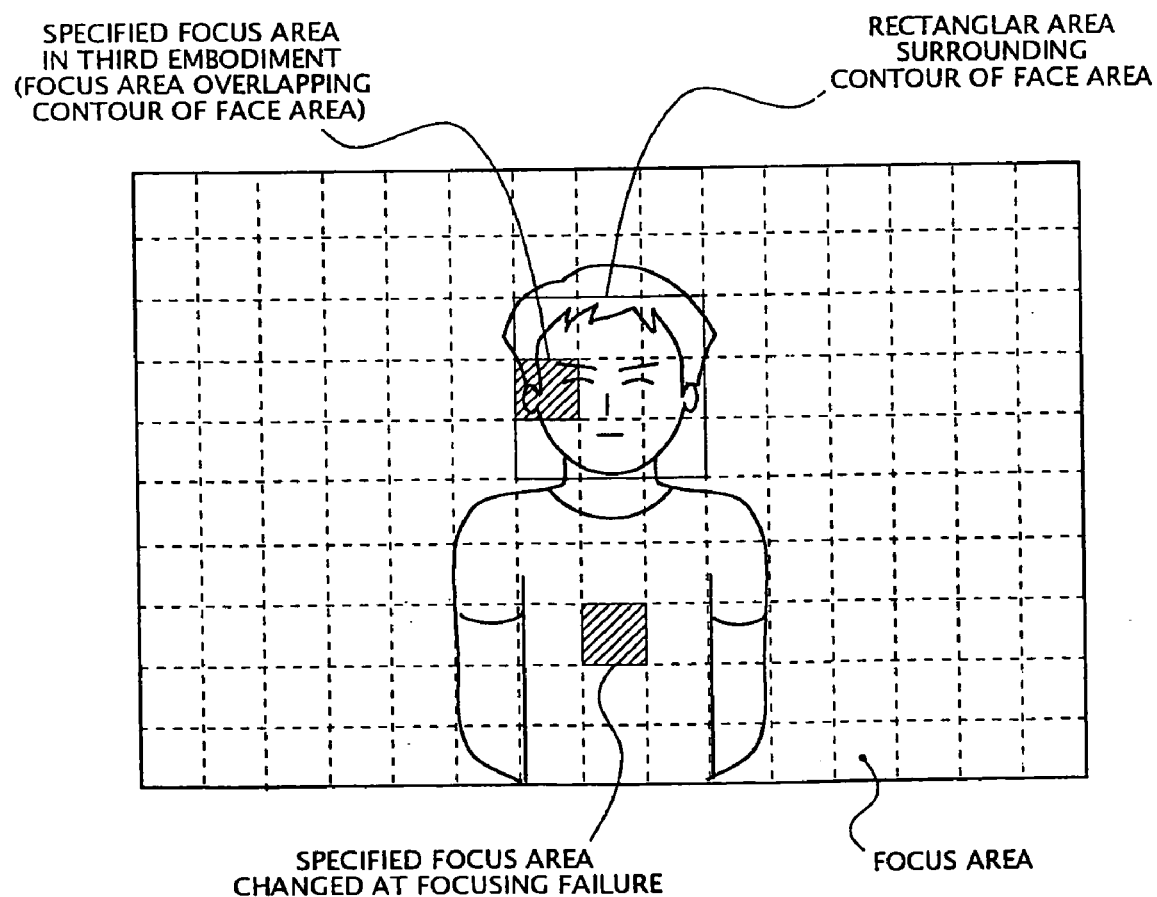
FIG. 21 is a view showing the position of a specified focus area in the fourth embodiment.

FIG. 20 is a flowchart showing a shooting operation in a fourth embodiment. Here, steps except S1205 of the fourth embodiment correspond to steps of the second embodiments, respectively, and a duplicate description will be omitted. Further, a block diagram of an electronic camera in the fourth embodiment is common to the second embodiment or the third embodiment, and it will be not shown.

step S1205: The CPU 23 sets, out of focus areas overlapping the contour of the face area, only part of the focus areas to the specified focus area based on the face recognition information (S1203) (See FIG. 21). Then, the CPU 23 performs the AF calculation by the hill-climbing operation based on the through image signals of the specified focus area.

Since the contour portion of the face area is set to the specified focus area also in S1205, the focusing accuracy in the face of the subject can be increased similarly to the second embodiment. However, in the focus area overlapping the lower contour of the face area, there is a high possibility that the contrast is lowered by the flesh-colored portion of a neck. Therefore, it is desirable that in S1205, the CPU 23 set the focus area overlapping the upper contour or the side contour of the face area to the specified focus area. Incidentally, when the upper or side focus area of the face area is used, the specified focus area is selected based on the vertical direction of the face detected by the CPU 23 or the output of the attitude sensor 26.

In this fourth embodiment, the specified focus area is smaller than that in the second embodiment, so that the calculation amount in the AF calculation is also reduced. Accordingly, the fourth embodiment makes it possible to simplify the circuit configuration of the CPU 23 and further speed up the AF calculation.

Supplementary Description of Embodiments

When there is a focusing failure in the specified focus area including the face area in the above second embodiment, the second AF calculation may be performed, for example, in the focus area at the center of the image shooting plane, regardless of a result of the face recognition. Further, in the fourth embodiment, when there is a focusing failure in the first specified focus area, the second AF calculation may be performed in another focus area of the face area. Furthermore, in the second embodiment, the focus failure indication may be given only when there is a focusing failure in the second AF calculation.

The invention is not limited to the above embodiments and various modifications may be made without departing from the spirit and scope of the invention. Any improvement may be made in part or all of the components.

What is claimed is:

1. An electronic camera, comprising: a face detecting section which detects a face of a subject;
    a setting section which sets a scene shooting mode to adjust a shooting condition to an optimum shooting condition in accordance with each of pre-assumed shooting scenes; and
    a controlling section which controls the face detection of said face detecting section when said setting section has set a scene shooting mode for shooting a scene including a person, wherein
    the scene shooting mode for shooting the scene including a person is a portrait shooting mode, and
    said controlling section does not allow said face detecting section to perform the face detection when the portrait shooting mode is a night portrait shooting mode.

2. The electronic camera according to claim 1, wherein said controlling section controls a shooting lens to focus on a face area detected by said face detecting section.

3. The electronic camera according to claim 1, further comprising
    a function setting section which sets a function for each of scene shooting modes, wherein
    the scene shooting mode for shooting the scene including a person is provided with a setting item regarding the face detection.

4. The electronic camera according to claim 1, wherein during the face detection by said face detecting section, the electronic camera stops a digital zoom function of electronically magnifying a magnifying power.

5. The electronic camera according to claim 1, wherein during the face detection by said face detecting section, the electronic camera stops a closeup shooting function of shifting a shooting lens for closeup shooting.

6. The electronic camera according to claim 1, further comprising
    a display section which displays a subject image obtained before shooting, wherein
    during the face detection by said face detecting section, an amount of shooting information for display on said display section is reduced compared with while the face detection is not performed.

\* \* \* \* \*